Dec. 7, 1926. 1,609,566
R. D. MAYO
FAUCET
Filed Sept. 24, 1924 2 Sheets-Sheet 1
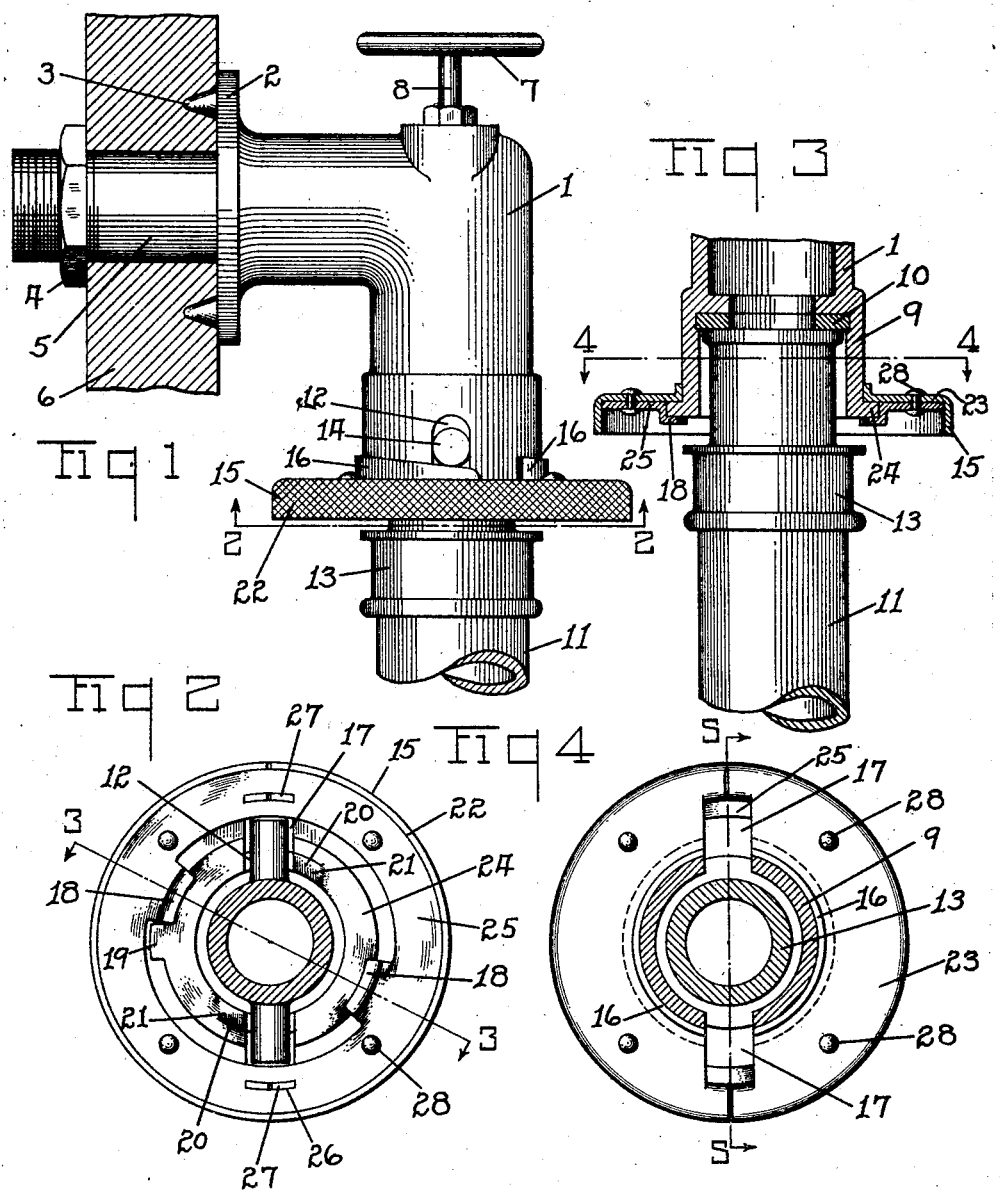
Inventor
Robert Diamond Mayo
By Owen, Owen & Crampton
Attorney Dec. 7, 1926.
R. D. MAYO
1,609,566
FAUCET
Filed Sept. 24, 1924   2 Sheets-Sheet 2
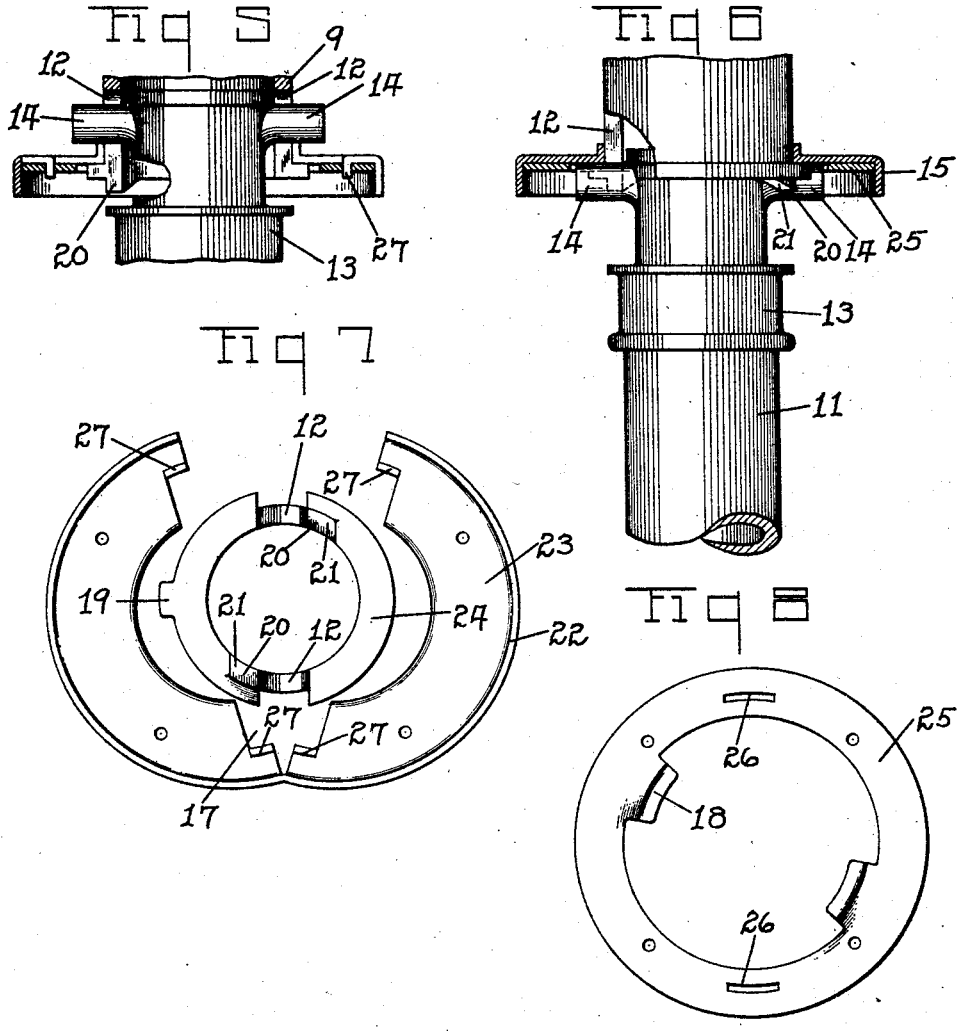

Patented Dec. 7, 1926.

1,609,566

UNITED STATES PATENT OFFICE.

ROBERT DIAMOND MAYO, OF CLEVELAND, OHIO.

FAUCET.

Application filed September 24, 1924. Serial No. 739,460.

My invention has for its object to provide a combined faucet and hose connecting member wherein the hose, such as a garden hose, may be readily connected to the faucet. The invention particularly provides a means whereby the connection may be made without the necessity of rotating the hose connector and consequently without rotating the body of the hose, in order, as is commonly done, to screw the hose connector into a faucet. Instead, the connection is made by means of a pair of protruding lugs that are connected to the sides of the connector and which are inserted in a pair of slots extending mouthwise relative to the faucet and are secured and clamped to seal the connector by pressure against a suitable washer by rotation of a cam member that engages the protruding lugs. In the preferred embodiment of my invention, means is provided for securing the faucet in such a manner that it cannot be removed by ordinary plumbers' tools used exterior to the building or on the side of a wall on which the faucet is located, and for rendering removal of the cam member difficult.

The invention, however, may be contained in faucets of different forms and used for different purposes. To illustrate a practical application of the invention I have selected a particular embodiment which is illustrative of structures that contain my invention and shall describe it hereinafter. The structure which is selected for purposes of illustration and as an example is a preferred embodiment of my invention and is shown in the accompanying drawings.

Figure 1 of the drawings illustrates a side view of a faucet selected as an example of structures containing my invention. Figure 2 is a view of a section taken on the plane of the line 2—2 indicated in Fig. 1. Figure 3 is a view of a section taken on the plane of the line 3—3 indicated in Fig. 2. Figure 4 is a view of a section taken on the plane of the line 4—4 indicated in Fig. 3. Figure 5 is a view of a section taken on the line 5—5 indicated in Fig. 4. Figure 6 is a side view of a part of the faucet and shows other parts of the faucet in elevation. Figure 7 illustrates one of the rings which are united together to form a rotatable cam member that is secured to the end of the faucet. Figure 8 illustrates another ring which is secured to the ring shown in Fig. 7 to render permanent the connection of the cam member to the faucet.

The faucet is secured by means located within the wall to which it is connected or on which it is mounted, and so that it cannot be removed except by operations on the connecting parts located within the wall or at the side of the wall opposite to the faucet. The faucet 1 is provided with a wall flange 2 having pointed lugs 3 that are adapted to penetrate the surface of the wall on the side of which the faucet 1 is mounted. The faucet 1 is drawn towards the wall so as to cause the penetration of the protruding pointed lugs 3 by means of a burr 4 that is threaded on to the nipple 5 of the faucet and which is screwed down against the wall 6. When the points 3 have penetrated the wall, the faucet 1 cannot be rotated to disconnect it. The main water supply pipe may be connected to the faucet by a suitable connector in the manner well known in the art.

The faucet 1 may be provided with any form of valve that may be operated by the valve handle 7 which is connected to the valve stem 8. The outlet of the faucet 1 is provided with a socket portion 9 in which a suitable washer 10 of the type well known in the art may be located. In order to connect a hose, such as the hose 11, to the faucet, the socket portion is provided with a pair of oppositely disposed slots 12, and the hose 11 is provided with a connector member 13 that has two protruding lugs 14 that extend from opposite sides of the connector member 13 and which are adapted to be inserted in the slots 12 until the end of the connector 13 presses against the washer 10. The lugs 14 are secured in position and the end of the hose connector 13 is pressed against the washer 10 by means of a cam member 15 that is adapted to engage the outer ends of the lugs 14. The ends of the lugs 14 are of sufficient length to protrude through the slots 12 and a short distance beyond the outer surface of the socket part 9 of the faucet 1, and so as to be engaged by the cam member 15. The cam member 15 is provided with a pair of upwardly extending cam shaped flanges 16 that extend along the inner edge of the ring. They fit the surface of the exterior of the socket part 9 of the faucet 1. They terminate at slots 17 that extend inward from the central opening, that forms the annulus, a short distance, so as to permit the lugs 14 that protrude from the connector 13 to enter the slots 12 of the socket part 9 of the faucet, and to pass the lower corners of the cam flanges 16. Thus upon rotataion of the ring 15 in a clockwise direction, the edges of the cam shaped flanges 15 will engage the ends of the lugs 14 and thus securely clamp the connector member 13 in position in the faucet and form a sealing connection between the faucet 1 and the hose 11.

In order that the connection may be easily made, if desired in the dark, means is provided for indicating the relative positions of the lugs 14 that protrude from the connector 13 of the hose 11 relative to the cam ring 15, and means is provided for disposing the cam ring in position such that its slots 17 are in alignment with the slots 12 of the faucet 1, thus enabling immediate insertion of the connector in position in the faucet. The cam ring is provided with a pair of protruding tongues 18, while the lower end of the faucet 1, namely, the lower end of the socket portion 9 of the faucet, is provided with a lug 19. The inwardly extending tongues 18 are so disposed with reference to the other parts of the ring that rotation to the left, that is, counter clockwise rotation, will bring the slots 17 of the ring in alignment with the slots 12 of the faucet. Thus the lugs 14 may be inserted in position in the slots 12 and rotation in the reverse direction, such as clockwise, will clamp the connector 13 in position.

When the connector 13 is about to be inserted, the lugs 14 are guided to their proper positions relative to the slots 12 by means of depending portions 20 that extend from the end of the faucet 1 and which are located beside the slots 12. One side of each slot 12 continues downwardly to form one side of each of the projections 20, each slot 12 being provided with but one projection, which is located on the clockwise side of the slot and so that when the connector 13 is rotated clockwise with respect to the faucet 1, the projections 14 will strike the depending portions 20 and be brought to a stop in alignment with the slots 12. Upward movement of the connector 13 will cause the lugs 14 to enter the slots 12. Rotation of the cam ring 15 will then lock the connector in position. Rotation of the connector counter clockwise with respect to the end of the faucet will also indicate, to the one that is making the connection, the point in the rotation when the connector 13 is in alignment with the slots 12. The depending portions 20 are provided with inclined surfaces 21 that extend from the lower end of the surface of the body of the socket part 9 to the surface of the depending portion 20 that is in line with the surface of the slot 12 in each case, and consequently when the connector 13 is rotated counter clockwise, the lugs 14 will be depressed when they meet the surfaces 20 until they pass the lower edges of the surfaces, whereupon the natural pressure which is exerted on the connector 13 in keeping the lugs 14 in contact with the end of the faucet will cause the lugs 14 to enter the slots 12, whereupon the ring 15 may be rotated clockwise to lock the connector in its sealed relation to the faucet 1.

In order to quite permanently connect the ring to the faucet, the faucet being permanently connected to the wall by the pointed lugs that are attached to the flange 2, and in order that a good engagement may be made with the building or wall 6 to prevent rotation of the faucet, and in order that the ring 15 may be provided with a suitable bearing shoulder on the end of the faucet, the ring 15 is so formed that it may be located intermediate these portions and particularly intermediate its bearing shoulder of the faucet and the enlarged parts or portions of the faucet that contain the valve member. The ring 15 is so formed that it may be slipped over the bearing shoulder and secured to the bearing shoulder so that it may not be readily disconnected therefrom. As shown in the drawings, the ring of the preferred form of my invention is formed of two parts, one of which may be a split ring and the other may be a locking ring for securing the portions of the split ring together and at the same time locking the cam ring 15 in position at the end of the faucet 1. The split ring may be divided in two parts if desired, or it may be opened along a greater portion of one of its diameters and so that it may be open. In the form of construction shown, the cam ring is provided with a depending knurled flange 22 which aids in grasping and rotation of the ring when the connector 13 is to be connected or to be disconnected to or from the faucet 1. The depending knurled flange 22 forms a part of the split ring 23 and the diametrical cut may be made through one side of the depending flange 22 and through the slots 17 that are formed in the split ring 23 to the other side of the depending flange 22, whereupon the ring 23 may be opened by bending along a line extending transversely with respect to the flange 22, that is, along the line that extends downwardly when the ring is in the position shown in Fig. 1. The split ring 23 may then be placed on the end of the faucet 1 and above a protruding shoulder formed by the flange 24 that extends laterally from the end of the faucet 1. The sides of the split ring 23 may then be closed together and locked in position by means of the ring 25 that forms the other part of the cam ring 15. The ring 25 is provided with slots 26 that extend circularly and are located on diametrically opposite sides of the ring 25, while the ring 23 is provided with a plurality of tongues 27. The tongues 27 are disposed on opposite sides of the diametric cut that is made in dividing the ring 23 into two parts. The location of the tongues 27 on each side of the cut that divides the ring 23 into its two parts is such that when the parts are closed together they will register with the slots 26 when the ring 25 is placed within the ring 23 and against its under side. Thus the parts of the split ring 23 may be connected together and may be locked by the tongues 27 that may be bent over the edges of the slots 26 formed in the ring 25. The ring 25 may be further secured to the ring 23 by means of the rivets 28. The ring 25 is provided with the tongues 18 that extend over the lower edge of the flange 24 and consequently the tongues 18, together with the inner edge portion of the ring 23, form bearing surfaces that engage the flange 24 and secure the cam ring 15 in its rotative relation with respect to the faucet 1.

I claim:—

1. In combination with a faucet having slots and a connector having lugs, a clamping ring having cam flanges for engaging the lugs and formed of two parts, one of the parts being a split ring and the other of the parts being a complete annulus, the split ring having tongues and the annulus having slots for receiving the tongues and locking the parts of the split ring together.

2. In combination with a faucet having slots and a connector having lugs, a clamping ring having cam flanges for engaging the lugs and formed of two parts, one of the parts being a split ring and the other of the parts being a complete annulus, the split ring having tongues and the annulus having slots for receiving the tongues and locking the parts of the split ring together, a flange located on the end of the faucet, the annulus having inwardly extending tongues for securing the clamping ring in position on the flange for rotative movements about the end of the faucet.

3. In combination with a faucet having slots and a connector having lugs, a clamping ring having cam flanges for engaging the lugs and formed of two parts, one of the parts being a split ring and the other of the parts being a complete annulus, the split ring having tongues and the annulus having slots for receiving the tongues and locking the parts of the split ring together, a flange located on the end of the faucet and the annulus having inwardly extending tongues for securing the clamping ring in position on the flange for rotative movements about the end of the faucet, the flange of the faucet having a protruding tongue for engaging one or the other of the tongues of the annulus for limiting the rotative movements of the clamping ring.

In testimony whereof I have hereunto signed my name to this specification.

ROBERT DIAMOND MAYO.